United States Patent
Pasteris et al.

(10) Patent No.: US 9,204,112 B2
(45) Date of Patent: Dec. 1, 2015

(54) SYSTEMS, CIRCUITS, AND METHODS FOR EFFICIENT HIERARCHICAL OBJECT RECOGNITION BASED ON CLUSTERED INVARIANT FEATURES

(71) Applicant: STMicroelectronics S.r.l, Agrate Brianza (IT)

(72) Inventors: Paolo Pasteris, Agrate Brianza (IT); Giovanni Condello, Pavia (IT); Danilo Pietro Pau, Sesto San Giovanni (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 0 days.

(21) Appl. No.: 13/762,267

(22) Filed: Feb. 7, 2013

(65) Prior Publication Data

US 2013/0216143 A1    Aug. 22, 2013

Related U.S. Application Data (60) Provisional application No. 61/596,111, filed on Feb. 7, 2012, provisional application No. 61/596,142, filed on Feb. 7, 2012, provisional application No. 61/596,149, filed on Feb. 7, 2012.

(51) Int. Cl.
G06K 9/62        (2006.01)
H04N 19/124   (2014.01)
G06K 9/00        (2006.01)
(Continued)

(52) U.S. Cl.
CPC ........ *H04N 7/26079* (2013.01); *G06K 9/00523* (2013.01); *G06K 9/00671* (2013.01); *G06K 9/46* (2013.01); *G06K 9/4671* (2013.01); *G06K 9/6218* (2013.01); *H04N 19/124* (2014.11); *H04N 19/13* (2014.11); *H04N 19/91* (2014.11)

(58) Field of Classification Search
CPC ............ G06K 9/6218; G06K 2209/01; G06K 9/00711; G06K 9/00523; G06K 9/00671; G06K 9/4671; G06K 9/4604; G06K 9/38; G06T 7/008; H04N 19/13; H04N 19/124; H04N 19/91
USPC ......... 382/225, 282, 190, 103, 219, 305, 173; 706/20
See application file for complete search history.

(56) References Cited

U.S. PATENT DOCUMENTS 5,867,386 A    2/1999  Hoffberg et al.
6,411,724 B1  6/2002  Vaithilingam et al.
(Continued)

OTHER PUBLICATIONS

Outdoors Augmented Reality on Mobile Phone Using Loxel-Based Visual Feature Organization; Taikacs, Xiong, Chandrashekhar, MIR-2008; Canada, ACM 978-60558-9/08/10.*

(Continued)

*Primary Examiner* — Utpal Shah
*Assistant Examiner* — Pinalben Patel
(74) *Attorney, Agent, or Firm* — Seed IP Law Group PLLC (57) ABSTRACT

One embodiment is a method for selecting and grouping key points extracted by applying a feature detector on a scene being analyzed. The method includes grouping the extracted key points into clusters that enforce a geometric relation between members of a cluster, scoring and sorting the clusters, identifying and discarding clusters that are comprised of points which represent the background noise of the image, and sub-sampling the remaining clusters to provide a smaller number of key points for the scene.

13 Claims, 4 Drawing Sheets

(51) Int. Cl.
  *G06K 9/46* (2006.01)
  *H04N 19/13* (2014.01)
  *H04N 19/91* (2014.01)

(56) References Cited

U.S. PATENT DOCUMENTS

| | | | |
|---|---|---|---|
| 6,618,507 | B1 | 9/2003 | Divakaran et al. |
| 6,646,676 | B1 | 11/2003 | DaGraca et al. |
| 6,711,293 | B1 * | 3/2004 | Lowe ............................. 382/219 |
| 6,778,708 | B1 | 8/2004 | Divakaran et al. |
| 6,968,006 | B1 | 11/2005 | Puri et al. |
| 7,143,434 | B1 | 11/2006 | Paek et al. |
| 7,412,427 | B2 | 8/2008 | Zitnick et al. |
| 7,715,475 | B1 | 5/2010 | Puri et al. |
| 8,031,768 | B2 | 10/2011 | Wen |
| 8,156,116 | B2 | 4/2012 | Graham et al. |
| 8,306,747 | B1 | 11/2012 | Gagarin et al. |
| 8,447,767 | B2 | 5/2013 | Ah-Pine et al. |
| 8,467,570 | B2 * | 6/2013 | Ma et al. ........................ 382/103 |
| 2002/0102020 | A1 | 8/2002 | Qian et al. |
| 2008/0123959 | A1 * | 5/2008 | Ratner et al. .................. 382/173 |
| 2008/0304563 | A1 | 12/2008 | Schoenblum |
| 2009/0290812 | A1 * | 11/2009 | Naaman et al. ............... 382/305 |
| 2010/0310174 | A1 | 12/2010 | Reznik |
| 2011/0052003 | A1 * | 3/2011 | Cobb et al. .................... 382/103 |
| 2011/0274355 | A1 | 11/2011 | Oami et al. |
| 2012/0002868 | A1 * | 1/2012 | Loui et al. ..................... 382/159 |
| 2012/0013491 | A1 | 1/2012 | Chen et al. |
| 2012/0051425 | A1 | 3/2012 | Chong et al. |
| 2013/0016912 | A1 | 1/2013 | Li et al. |
| 2013/0216135 | A1 | 8/2013 | Pau |
| 2014/0133550 | A1 | 5/2014 | Pau |
| 2014/0185949 | A1 | 7/2014 | Pau et al. |

OTHER PUBLICATIONS

Rapid Object Detection using a Boosted Cascade of Simple Features, Accepted Conference on Computer Vision and Pattern Recognition 2001, Paul Viola, Michael Jones, Mitsubishi Electric Research Labs, Compaq CRL.*

Yang, Evaluating Bag-of-Visual-Words Representations in Scene Classification, Proceedings of the international workshop on workshop on multimedia information 2007.*

Ertoz, Finding clusters of different sizes, shapes, and densities in noisy, high dimensional data. In Proceedings of the 2003 SIAM International Conference on Data Mining, 2003.*

David G. Lowe, "Distinctive Image Features from Scale-Invariant Keypoints," International Journal of Computer Vision, Jan. 5, 2004, pp. 1-28, vol. 60, No. 2, University of British Columbia, Computer Science Department, Vancouver, B.C., Canada.

Herbery Bay et al., "Speeded-Up Robust Features (SURF)," Computer Vision and Image Understanding (CVIU), Sep. 10, 2008, pp. 1-14, vol. 110, No. 3.

Martin A. Fischler et al., "Random Sample Consensus: A Paradigm for Model Fitting with Applications to Image Analysis and Automated Cartography," Artificial Intelligence Center, SRI, International, Jun. 1981, vol. 24, No. 6, Menlo Park, California.

Vijay Chandrasekhar et al., "Compressed Histogram of Gradients: A Low-Bitrate Descriptor," International Journal on Computer Vision, May 15, 2011, pp. 1-16, vol. 94, No. 5, University of Stanford, USA.

"Call for Proposals for Compact Descriptors for Visual Search," Requirements Subgroup, International Organisation for Standardisation, Coding of Moving Pictures and Audio, ISO/IEC JTC1/SC29/WG11/N12201, Jul. 2011, Torino, IT, 5 pages.

"Description of Test Model under Consideration for CDVS," Video Subgroup, International Organisation for Standardisation, Coding of Moving Pictures and Audio, ISO/IEC JTC1/SC29/WG11/N12367, Francini et al. (eds.), Dec. 2011, Geneva, CH, 24 pages.

"Evaluation Framework for Compact Descriptors for Visual Search," International Organisation for Standardisation Coding of Moving Pictures and Audio, ISO/IEC JTC1/SC29/WG11/N12202, Jul. 2011, Torino, IT, 14 pages.

"Huffman coding," Wikipedia, retrieved from http://en.wikipedia.org/wiki/Huffman_coding, on Mar. 17, 2015, 11 pages.

"Low-voltage differential signaling," Wikipedia, retrieved from http://en.wikipedia.org/w/index.php?title=Low-voltage_differential_signaling&printable=yes, on Mar. 18, 2015, 7 pages.

Bodden et al., "Arithmetic Coding Revealed: A Guided Tour from Theory to Praxis," McGill University School of Computer Science, Sable Research Group, May 25, 2007, pp. 1-60, Montreal, Quebec, Canada.

Brasnett, et al., "A Robust Visual Identifier Using the Trace Transform," Visual Information Engineering Conference 2007, 6 pages.

Calonder et al., "BRIEF: Binary Robust Independent Elementary Features," 11$^{th}$ European Conference on Computer Vision, Sep. 5-11, 2010, Heraklion, Crete, Greece, pp. 778-792.

Chandrasekhar et al., "Comparison of Local Feature Descriptors for Mobile Visual Search," 17$^{th}$ IEEE International Conference on Image Processing, Sep. 26-29, 2010, Hong Kong, pp. 3885-3888.

Chandrasekhar et al., "Survey of SIFT Compression Schemes," *Proc. Int. Workshop Mobile Multimedia Processing*, 2010, 8 pages.

Chandrasekhar et al., "Transform Coding of Image Features Descriptors," *Proc. SPIE7257*, Visual Communications and Image Processing, Jan. 18, 2009, San Jose, CA, 725710, 9 pages.

Euro NCAP Advanced Rewards, retrieved from http://www.euroncap.com/en/ratings-rewards/euro-ncap-advanced-rewards/, on Mar. 18, 2015, 2 pages.

Girod et al., "Mobile Visual Search IEEE Signal Processing Magazine," [61] Jul. 2011, 16 pages.

Hess, "SIFT Library," retrieved from http://blogs.oregonstate.edu/hess/code/sift/, on Mar. 18, 2015, 3 pages.

Jegou et al., "Product quantization for nearest neighbor search," *IEEE Transactions on Pattern Analysis and Machine Intelligence* 33(1):117-128, Mar. 18, 2010.

Ke et al., "PCA-SIFT: A More Distinctive Representation for Local Image Descriptors," IEEE Computer Society Conference on Computer Vision and Pattern Recognition, Jun. 27-Jul. 2, 2004, pp. II-506 to II-513.

Lepsøy et al., "Statistical Modelling of Outliers for Fast Visual Search," IEEE International Conference on Multimedia and Expo, Jul. 11-15, 2011, Barcelona, pp. 1-6.

Malaguti et al., "Toward compressed 3D descriptors," 2012 Second Joint 3DIM/3DPVT Conference: 3D Imaging, Modeling, Processing, Visualization & Transmission, pp. 176-183.

Narozny et al., "ICA based algorithms for computing optimal 1-D linear block transforms in variable high-rate source coding," Signal Process, Elsevier, 2008, 88(2), pp. 268-283.

Nistér et al., "Scalable Recognition with a Vocabulary Tree," IEEE Computer Society Conference on Computer Vision and Pattern Recognition, 2006, pp. 2161-2168.

Papadakis et al., "3D object retrieval using an efficient and compact hybrid shape descriptor," Eurographics Workshop on 3D Object Retrieval, 2008, 8 pages.

Papakostas et al., "An efficient feature extraction methodology for computer vision applications using wavelet compressed Zernike moments," ICGST International Journal on Graphics, Vision and Image Processing, Special Issue: Wavelets and Their Applications SI1 (2005): 5-15.

Pau, "Status on UBC's SIFT patent," STMicroelectronics, International Organisation for Standardisation Coding of Moving Pictures and Audio, ISO/IEC JTC1/SC29/WG11 MPEG2012/m23564, Feb. 2012, San Jose, USA, 10 pages.

(56) References Cited

OTHER PUBLICATIONS

Renesas Electronics, "Automotive," webpage, retrieved from http://renesas.com/applications/automotive/ on Mar. 18, 2015, 2 pages.

Reznik et al., "Fast Quantization and Matching of Histogram-Based Image Features," *Proc. SPIE* 7798, Applications of Digital Image Processing XXXIII, 77980L, Sep. 7, 2010, 14 pages.

Tombari et al., "Unique Signatures of Histograms for Local Surface Description," Proceedings of the 11th European Conference on Computer Vision, Sep. 5-11, 2010, Crete, Greece, pp. 356-369.

Tombari et al., "A combined texture-shape descriptor for enhanced 3D feature matching," 18th IEEE International Conference on Image Processing, Sep. 11-14, 2011, Brussels, pp. 809-812.

Torralba et al., "Small Codes and Large Image Databases for Recognition," IEEE Conference on Computer Vision and Pattern Recognition, 2008, pp. 1-8.

VLFeat homepage, retrieved from http://vlfeat.org/, on Mar. 18, 2015, 2 pages.

Weiss et al., "Spectral Hashing," from *Advances in Neural Information Processing Systems 21*, 2008, 8 pages.

Winder et al., "Picking the best DAISY," IEEE Conference on Computer Vision and Pattern Recognition, Jun. 20-25, 2009, Miami, FL, pp. 178-185.

Yeo et al., "Rate-efficient visual correspondences using random projections," 15th IEEE International Conference on Image Processing, Oct. 12-15, 2008, San Diego, CA, pp. 217-220.

\* cited by examiner

SYSTEMS, CIRCUITS, AND METHODS FOR EFFICIENT HIERARCHICAL OBJECT RECOGNITION BASED ON CLUSTERED INVARIANT FEATURES

PRIORITY CLAIM

This application claims priority to U.S. Provisional Patent Application Nos. 61/596,111, 61/596,149, and 61/596,142, all filed on Feb. 7, 2012 and each of which is incorporated herein by reference.

TECHNICAL FIELD

Embodiments of the present disclosure relate generally to visual search systems and, more specifically to systems, circuits, and methods that group image feature descriptors of a captured scene into clusters to improve matching with reference images and the efficiency of transmission of such image feature descriptors.

BACKGROUND

Visual search systems are known and operate to use captured images as "queries" for a database of reference images in order to retrieve information related to the content of the captured image. For example, after taking a photo of the facade of a museum, a user's smartphone that was used to capture the image processes the image to generate feature descriptors that effectively describe the image for purposes of the query. In such a situation, which is a rapidly growing area of visual search research and development, the smartphone thereafter communicates the generated feature descriptors to a remote system containing a database, and searches or queries the database using the feature descriptors to identify the captured image in the database. The remote system may thereafter communicate to the smartphone the results of this query for presentation to the user, such as the location, opening times, and ticket costs where the captured image is a museum that the user is interested in visiting.

A typical visual search pipeline includes an interest-points detector, a features descriptor generator, a matching stage, and a geometry consistency checker. The most successful visual search techniques make use of invariant features, where the term invariant refers to the ability of the detection algorithm to detect image points and describe its surrounding region in order to be tolerant to affine transformation, like rotation, translation and scaling. In the current state of the art there exist many invariant feature extraction and description algorithms. The Scale Invariant Feature Transform (SIFT) algorithm is often used as a reference algorithm because it is typically the algorithm that provides the best recognition rate (i.e., matching of feature descriptors associated with a captured image with the proper corresponding image in an image database). The computational costs of the SIFT algorithm, however, are quite high (e.g., less than 2 frames per second (FPS) at VGA resolution on a modern desktop computer) so there are other algorithms, like the Speeded Up Robust Features (SURF) algorithm, that sacrifice precision as obtained with the SIFT algorithm for improved speed.

In the typical visual search pipeline, the matching stage simply consists of a many to many comparison between the feature descriptors in the scene and the ones stored in the database using a predefined metric function which is dependent on the description algorithm (e.g. ratio of L2 norms for SIFT feature descriptors). Finally the geometry consistency checker, such as a Random Sample Consensus (RANSAC) checker, processes the entire set of matched feature descriptors to retrieve a valid transformation model for the query and reference images with the goal of removing false matches (i.e., outliers) and increasing the recognition quality of the algorithm. Typical visual search applications utilize pair-wise matching, which simply compares two images, and a more complex analysis named retrieval in which a query image is looked up inside of a reference image data set that is potentially a very large image database like Google Images™ or Flickr™.

Each of the phases described above requires high computational costs due to the amount of data involved or the complexity of the calculations. Also the number of bytes (i.e., the length) used in the feature descriptor is an important factor for a potential transmission overhead in a client-server environment, such as where a mobile device like a smartphone (i.e., the client) is the image capture device, as well as for amount of storage space required to store all the desired the content of the image database (i.e., the server). Improvements in the matching stage have been proposed, such as by the creator of the SIFT algorithm who proposed the use of KD-Trees to approximate the lookup of the nearest feature vector inside a database. Other improvements have been applied to the geometry consistency checker using algorithms that are less computationally intensive than RANSAC, such as the DISTRAT algorithm. Finally the compression and transmission of the image's features in the form of the feature descriptors is the core topic of Motion Pictures Expert Groups (MPEG) standardization group named Compact Descriptors for Visual Search (CDVS). For example, the Compress Histogram of Gradients (CHOG) algorithm is a feature descriptor algorithm or approach designed to produce a compact representation by applying sampling and discretization to SIFT-like feature descriptors.

SUMMARY

An embodiment is a method for selecting and grouping key points extracted by applying a feature detector on a scene being analyzed. The method includes grouping the extracted key points into clusters that enforce a geometric relation between members of a cluster, scoring and sorting the clusters, identifying and discarding clusters that are comprised of points which represent the background noise of the image, and sub-sampling the remaining clusters to provide a smaller number of key points for the scene. The method of can include iteratively applying the operations of grouping through sub-sampling to a set of reference images including sets comprised of a single reference image. The method can further include using clusters information to match clusters in the two images by using a metric which is defined by selected invariant features descriptors and by exploiting the sub-sampled cluster data to reduce the complexity of the matching phase including an early discard of clusters that cannot be probably found between extracted clusters. The method also can include tracking multiple independently moving objects in the scene being analyzed or detecting multiple objects found in the scene being analyzed.

DETAILED DESCRIPTION

Visual search for mobile devices relies on transmitting wirelessly a compact representation of the captured or query image, generally in the form of feature descriptors, to a remote server. The feature descriptors are therefore compressed so as to reduce the bandwidth occupancy and network latency of this transmission. Given the impressive pace of growth of 3D video technology, 3D visual search applications for the mobile and the robotic markets will become a reality. Accordingly, embodiments described herein are directed to improving detection of salient features and generation of corresponding feature descriptors that reduce the bandwidth required for such prospective applications through a hierarchical method using clustering of invariant features of a scene being analyzed, as will be described in more detail below.

Figure 1:
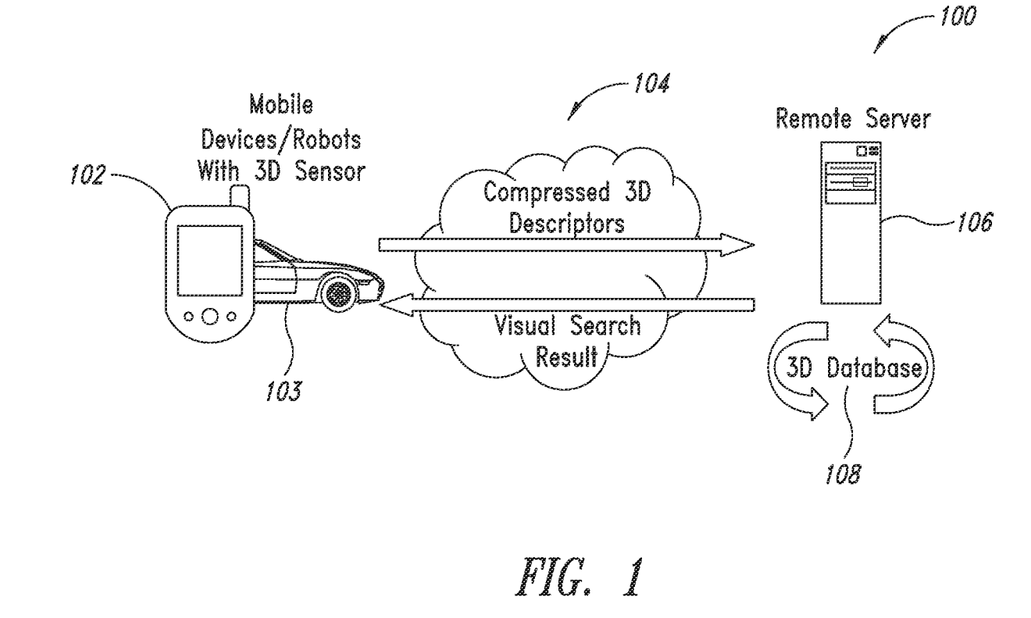
FIG. 1 is a functional block diagram of visual search system including search pipelines of FIG. 2 or 3 according to one embodiment of the present disclosure.

A representative visual search system 100 is illustrated in FIG. 1 and includes a local image capture device 102, such as a mobile device like a smartphone, an automobile 103 including two-dimensional or three-dimensional sensors for navigation, or an image capture system positioned at a certain location in a city such as a camera (not shown in FIG. 1) mounted on top of a lamppost at a particular intersection. The local image capture device 102 generates two- or three-dimensional uncompressed feature descriptors for the scene being imaged. These feature descriptors must then be communicated over a communications network 104 to a remote server 106 containing a visual database 108 that will be queried to identify an image in the database corresponding to the local image captured by the device 102 and represented by the communicated feature descriptors. The remote server 106 then returns the visual search results to the local image capture device 102 for use by the device or a user of the device. Embodiments disclosed herein are directed to methods of compressing these uncompressed feature descriptors generated by the local image capture device 102 so that the bandwidth of the communications network 104 is sufficient to provide the desired overall operation of the system 100. As illustrated in FIG. 1, the device 102 provides compressed 3D feature descriptors in this example over the communication network 104 to the remote server 106.

In the following description, certain details are set forth to provide a sufficient understanding of the present invention, but one skilled in the art will appreciate that the invention may be practiced without these particular details. Furthermore, one skilled in the art will appreciate that the example embodiments described below do not limit the scope of the present invention, and will also understand various modifications, equivalents, and combinations of the disclosed example embodiments and components of such embodiments are within the scope of the present invention. Illustrations of the various embodiments, when presented by way of illustrative examples, are intended only to further illustrate certain details of the various embodiments, and should not be interpreted as limiting the scope of the present invention. Finally, in other instances below, the operation of well known components, processes, algorithms and protocols have not been shown or described in detail to avoid unnecessarily obscuring the present invention.

State of art invariant feature extraction and feature descriptor generation algorithms initially produce a large set of features and feature descriptors. After the matching and geometry checking phases, the number of features that could be correctly paired is an order of magnitude less. Because the matching stage compares each feature descriptor in a query image A with all the feature descriptors in a reference image B in an image database, the matching stage wastes a lot of time computing useless correspondences. In the literature some improvement are presented to improve comparison time performance by applying, for example, approximated research strategies based on search trees.

A query image does not usually contain only the subject of the research but also other objects and a background environment that results in the generation of feature descriptors that introduce noise in the query set. Embodiments described herein group the identified interest points in an image by evaluating a geometric constraint between them in order to later apply a full search comparison to a smaller extracted features data set, and the corresponding feature descriptors, which are geometrically similar. Embodiments also automatically identify and remove noisy features in the query image and thus send the smallest number possible of feature descriptors to the matching phase (i.e., from the local image capture device 102 to the remote server 106 in FIG. 1). Embodiments also detect multiple objects in a scene being analyzed.

Figure 2:
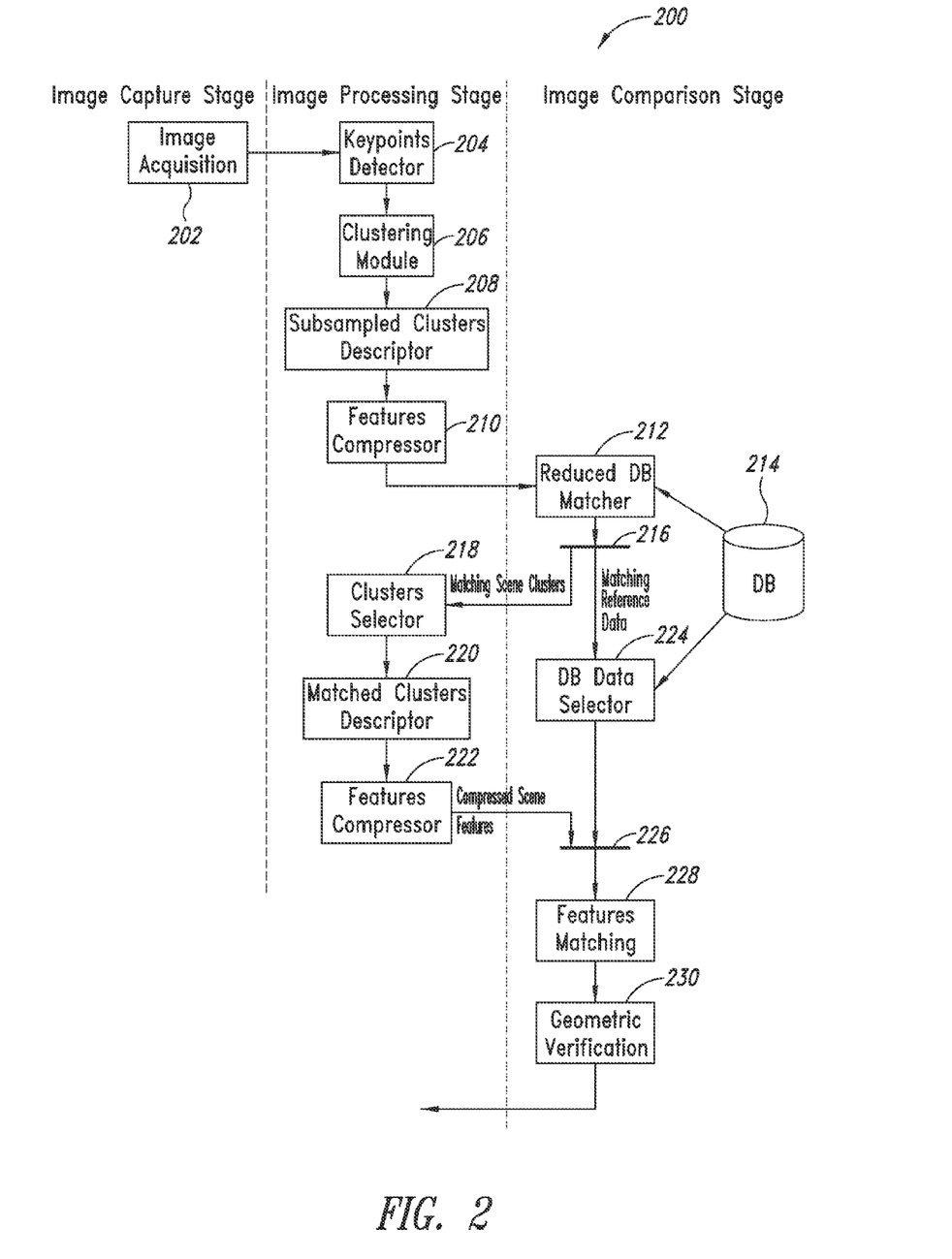
FIG. 2 is a functional block diagram illustrating a sequential visual search pipeline according to one embodiment described in the present disclosure.

The first step in embodiments described herein, after key point detection or feature extraction to generate corresponding feature descriptors, is a clustering stage that groups the points or feature descriptors using a desired metric. This is seen in FIG. 2 which is a functional block diagram illustrating a visual search pipeline 200 according to one embodiment described in the present disclosure. In one embodiment, the metric or algorithm exploits the spatial coherence of the key points or feature descriptors, as will be described in more detail below. In FIG. 2, the operations, modules, components, or circuits contained between the vertical dotted lines correspond to correspond to operations or circuitry in a local image capture device 202 (i.e., corresponds to device 102 of FIG. 1) while those to the right of the rightmost vertical dotted line correspond to those operations or circuitry in the server 106 of FIG. 1.

In the pipeline 200, an image is captured through an image capture device 202 and a key points detector 204 then identifies or extracts key points in the image and supplies these key points to a clustering module 206. The clustering module 206 then performs a grouping or clustering process on the extracted key points, or the corresponding feature descriptors, to generate clusters of features or feature descriptors. In one embodiment, the clustering process or metric executed by the clustering module 204 computes the distance of each key point or feature descriptor from its neighboring key points or feature descriptors in applying an eight-distance methodology in a prefixed circular region around the key point or feature descriptor being processed. If memory is available and a fixed image size is being used, this step can be replaced with a look-up table to save computational cost. The clustering module 204 executed the clustering metric to keep creating and/or merging clusters following a proximity relation of the clusters.

The module 204 executes this metric or algorithm until the size and density of the clusters reach a variable threshold. This process builds a variable number of clusters with different densities that we can associate to the idea of the quantity of information of the area. In accordance with this interpretation it is then possible to remove the low density sets or the smallest ones in order to focus the computation only on the portion of the image which is rich in information (i.e., contains a lot of feature descriptors). Accordingly, a subsampling module 206 selects, from among the clusters generated by the module 204, a number of the clusters identified as including more likely to include key points for further processing. A compression module 210 then compresses these features or key points in the selected clusters and communicates these compressed features to the server, which corresponds to the components to the right of the rightmost vertical dashed line in FIG. 2 as mentioned above.

A reduced matching module 212 on the server side then executes a reduced database matching process to identify potential images stored in a reference image database 214 that may correspond to the captured image. A return module 216 then returns matched clusters, which are identified in the figure as "matching scene clusters," to the local image capture device. A cluster selection module 218 receives the matching scene clusters and provides them to a matched cluster descriptor module 220 which then generates the feature descriptors only for the features or key points contained in these matched clusters. A compression module 222 then compresses the generated feature descriptors and communicates these compressed feature descriptors to the server for further processing. More specifically, in the server a database data selection module 224 selects reference images from the database 214 to be further searched based on the matched cluster data from the return module 216 and corresponding images from the database 214. The database data selection module 224 provides this data to a return module 226 in the server, which also receives the compressed feature descriptors from the module 222. The server then performs additional visual searching through a features matching module 228 that uses the compressed feature descriptors and the matched cluster data and corresponding images to thereby identify reference images in the database 214 that correspond to the image captured by the device 202.

A geometric verification module 230 then analyzes the results of the most similar search results to ensure that these identified possible matches of the captured query image to the identified reference images in the database 214 are plausible. The module 230 processes the entire set of matched features between pairs of the query and identified references images to identify a valid transformation model between the two images in each pair in order to remove false reference image matches (i.e., eliminate outliers) and thereby increase the recognition quality of the pipeline 200. After processing by the geometric verification module 230, the module returns the identified reference image or image, typically along with additional information about these images, to the local image capture device 202 for suitable display and use on that device. The approach implemented through the visual search pipeline 200 of FIG. 2 removes background and low density information regions of captured image that hardly produce a correct association at the end of the entire process. This approach also allows ranking between several features clusters that can be exploited by the matching strategy being implemented, and potentially allows the search algorithm implemented in the server to work only on the most significant image region.

Figure 3:
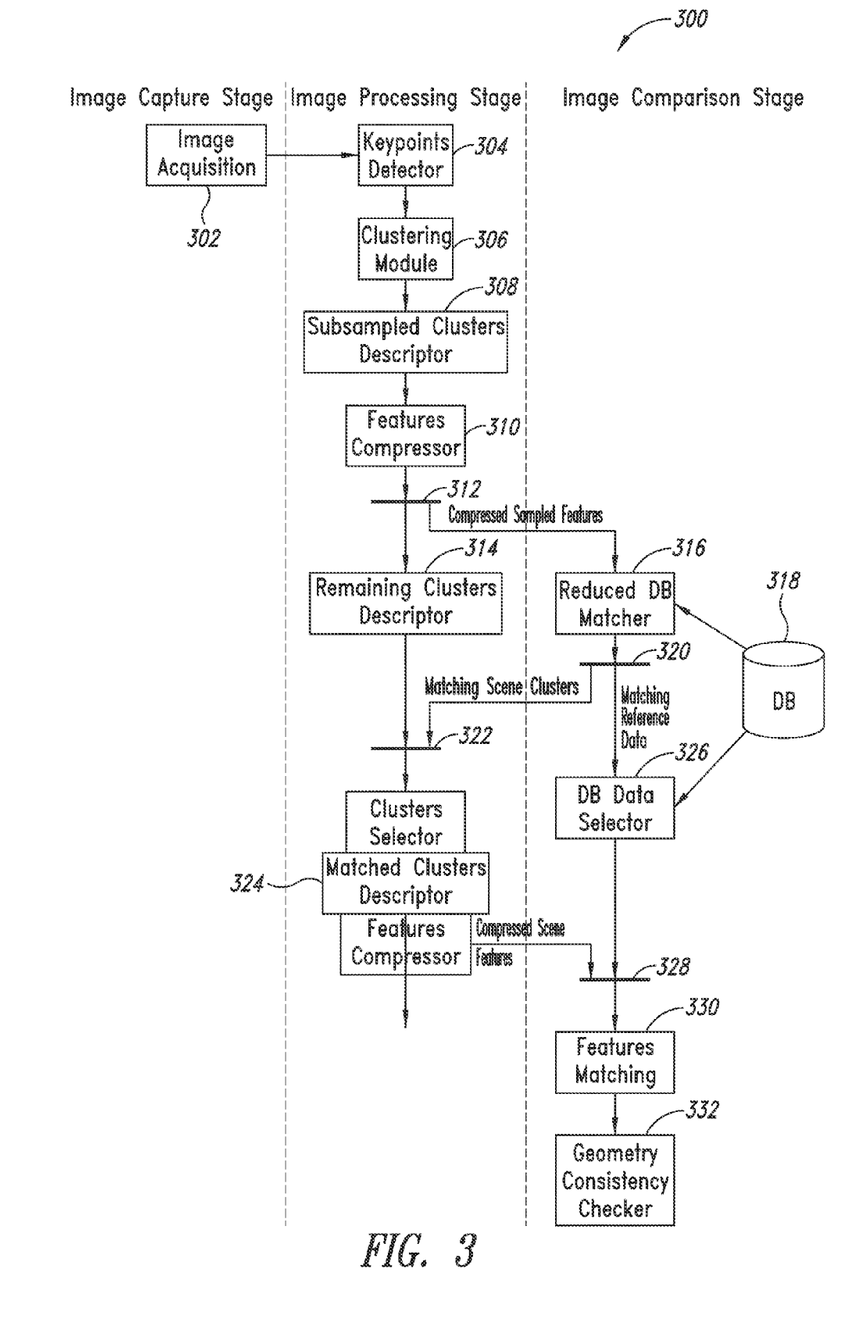
FIG. 3 is a functional block diagram illustrating a parallel visual search pipeline according to another embodiment described in the present disclosure.

FIG. 3 is a functional block diagram illustrating a parallel visual search pipeline 300 according to another embodiment of the present disclosure. The pipeline 300 includes the circuits, module, components or operations 302-332 whose functionality and operation will be clear from the detailed discussion above of corresponding or similar components 202-230 in the pipeline 200 of FIG. 2 and thus, for the sake of brevity, the detailed operation of these circuits or operations 302-332 will not be described in detail herein. The configuration shown in the embodiment of FIG. 3 is a parallel pipeline configuration as compared to the embodiment of the pipeline 200 just described with reference to FIG. 2, which is a sequential implementation. This is true because in the pipeline 300 the pipeline starts the computation of the feature descriptors of the remaining sets of clusters in a remaining clusters descriptors module 314 while the matching stage including the modules 316-320 in the server are still processing the quick matches provided from module 310. This approach may result in an increase in power consumption of the local image capture device 302 due to the possible wasted computations. This approach may nonetheless be useful to increase the overall speed of the pipeline 300, particularly where the bandwidth of the network coupling the local image capture device 302 to the server, and where the size of the reference image database 318 is very large and thus the search will take longer.

Figure 4:
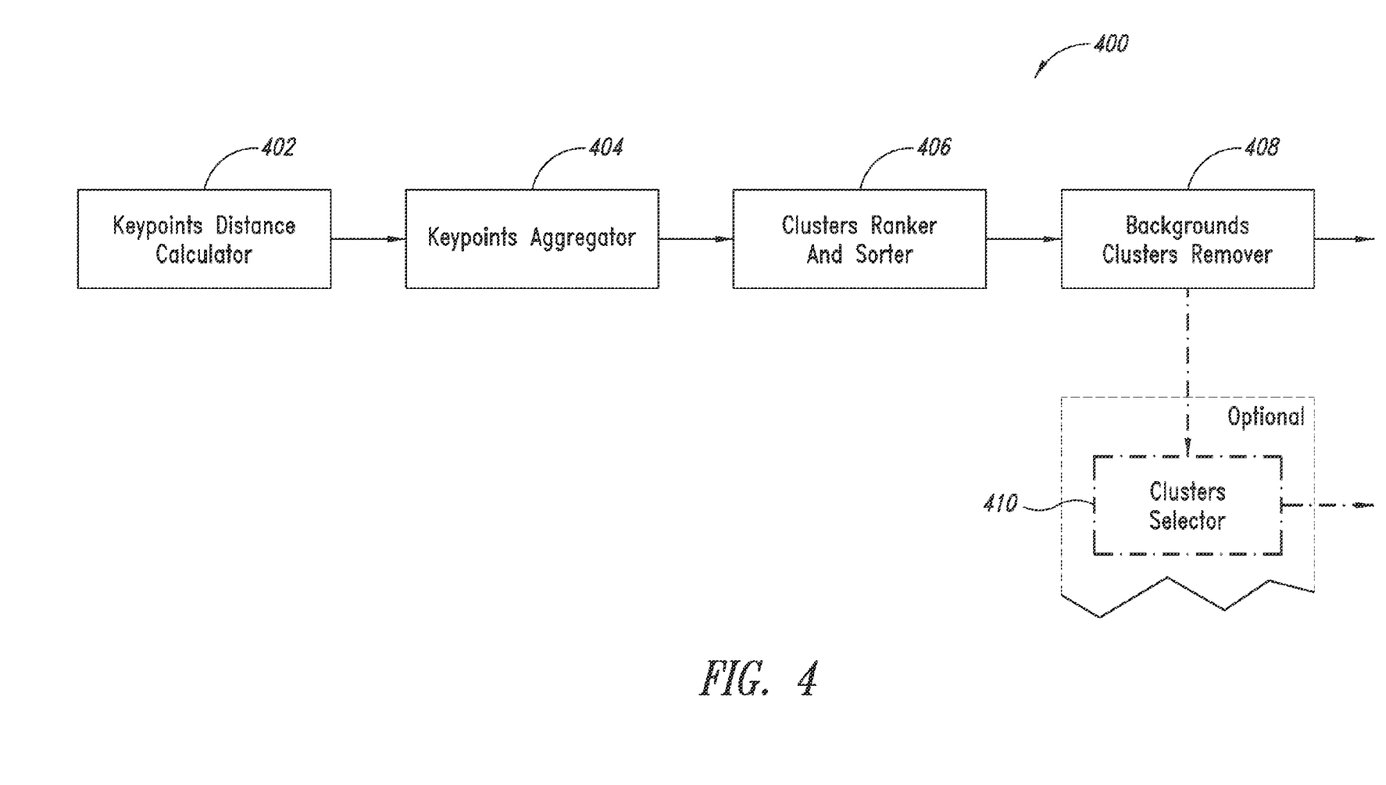
FIG. 4 is a functional block diagram of the clustering module of FIGS. 3 and 4 according to one embodiment described in the present disclosure.

FIG. 4 is a functional block diagram of the clustering module 206/306 of FIGS. 3 and 4 according to one embodiment described in the present disclosure. The functionality of the operations or circuits 402-410 will be understood in view of the discussion of FIGS. 2 and 3 set forth above and thus, for the sake of brevity, will not be described in more detail herein.

Normally the reference image portrays the object without ambiguity, so the top left edge of the object lie exactly in the same position in the image. This assumption is not true for the query image, because the object can appear in any position or rotation in the captured image, however, preventing the trivial match of the top left region of the two images. The proposed solutions in the described embodiments may randomly select, in each features cluster of both the query and reference images, a number of evenly spread candidates and may perform a full matching on this candidate data. This procedure allows the removal of reference system incoherence and quickly discriminating different objects using only a restricted number of features. In some embodiments, objects in captured image may be successfully identified using only 20% of the initial data for the captured image.

An issue in visual search system may be introduced by possible differences of scale of an object between the reference image and the query image. The increment of information in the magnified image, in fact, can generate multiple clusters that have to be potentially associated with a single cluster in the other image. To avoid this incoherence, embodiments of the proposed pipelines merge clusters that are part of a many-to-one relation.

Finally, in one embodiment to refine this quick discrimination and obtain an unique and robust result, the matching stage requests the transmission of the features belonging to the survived sets of clusters and after a new matching process, using all available data, removes most of the outliers using a RANSAC checking algorithm strategy to each cluster association.

The processes explained in the embodiments above allow multiple configurations of the pipeline 200/300 that have to be chosen with respect to the target application. the first possible configuration, namely the sequential pipeline, is shown in FIG. 2 and waits for the quick matching response and then computes the feature descriptors only in the survived sets potentially saving a lot of computation, particularly in the case of a non-matching query image, as discussed above. This leads to a lower power consumption of the local image capture device 202 since the processor (not shown in FIG. 2) performing these operations can remain idle during the matching stage being performed by the server.

Since the disclosed algorithms apply the geometry consistency check on the clusters pairs instead of the whole matching descriptors of the scene, embodiments according to the disclosed approach allow the recognition of objects belonging to two different scenes when no real affine transformation exists between the scenes themselves (e.g. the system can track two objects that are moving independently one from the other).

One skilled in the art will understand that even though various embodiments and advantages of the present disclosure have been set forth in the foregoing description, the above disclosure is illustrative only, and changes may be made in detail, and yet remain within the broad principles of the disclosure. For example, many of the components described above may be implemented using either digital or analog circuitry, or a combination of both, and also, where appropriate, may be realized through software executing on suitable processing circuitry. It should also be noted that the functions performed can be combined to be performed by fewer elements or process steps depending upon the actual embodiment being used in the system 100 of FIG. 1. Therefore, the present disclosure is to be limited only by the appended claims.

What is claimed is:

1. A method for selecting and grouping key points extracted by applying a feature detector on a scene being analyzed, the method comprising:
    grouping the extracted key points into clusters that enforce a geometric relation between members of a cluster;
    scoring and sorting the clusters based on the density of the key points in the clusters;
    identifying and discarding clusters that are comprised of key points which represent the background noise of the image based on the densities of the clusters;
    compressing the key points of the clusters that have not been discarded;
    communicating these compressed key points over a communications network;
    searching a reference image database using the compressed key points;
    identifying at least one cluster that was not discarded based on the searching of the reference image database;
    communicating the identity of the identified at least one cluster over the communications network;
    generating feature descriptors from the key points of the identified at least one cluster; and
    communicating the generated feature descriptors over the communications network.

2. The method of claim 1 comprising iteratively applying the operations of grouping through sub-sampling to a set of reference images including sets comprised of a single reference image.

3. The method of claim 2 further comprising using clusters information to match clusters in the two images by using a metric which is defined by selected invariant features descriptors and by exploiting the sub-sampled cluster data to reduce the complexity of the matching phase including an early discard of clusters that cannot be probably found between extracted clusters.

4. The method of claim 3 further comprising tracking multiple independently moving objects in the scene being analyzed.

5. The method of claim 3 further comprising detecting multiple objects found in the scene being analyzed.

6. A method for identifying a captured digital image in a reference image database, comprising:
    detecting key points in the captured digital image;
    grouping the key points into clusters;
    selecting at least one of the clusters on the basis of the number of key points contained in each of the clusters;
    compressing the key points in each of the selected clusters;
    performing an initial search of a reference image database utilizing the compressed key points of the selected clusters;
    identifying ones of the clusters for further analysis;
    generating feature descriptors for the key points in the identified ones of the clusters;
    compressing the generated feature descriptors; and
    searching the reference image database using the compressed feature descriptors to identify a reference image or images that correspond to the captured digital image.

7. The method of claim 6 further comprising, after selecting ones of the clusters, generating feature descriptors for the remainder of the clusters in parallel with the operations of compressing the key points in the selected clusters through identifying ones of the clusters for further analysis.

8. The method of claim 6, wherein the feature descriptors comprise SIFT feature descriptors.

9. The method of claim 6 further comprising performing a geometric verification on the captured image and identified reference images.

10. A visual search system, comprising:
    a local image capture device configured to capture digital images, detect key points in each of the captured digital images, cluster the key points to generate a plurality of key point clusters, and to subsample the detected key points for each image by selecting key point clusters on the basis of the number of key points contained in each of the clusters, the local image capture device further configured to compress the key points in the selected key point clusters and to communicate these compressed key points over a communications network;
    a remote server system coupled to the communications network to receive the compressed key points and configured to perform an initial search of a reference image database based on the compressed key points, and the remote server system further configured to identify ones of the selected clusters for further analysis based on results of the initial search and to communicate the identity of these ones of the selected clusters over the communications network to the local image capture device;
    wherein the local image capture device is further configured to receive the identity of the selected clusters for further analysis over the communications network and to generate feature descriptors from the key points of these identified selected clusters, compress the generated feature descriptors, and communicate these compressed feature descriptors over the communications network to the remote server system; and
    wherein the remote server system receives the compressed feature descriptors for the identified selected clusters over the communications network and performs further searching of the reference image database using these compressed feature descriptors to identify an image in the reference image database that corresponds to the captured digital image, and to communicate information about the identified image in the reference image database over the communications network to the local image capture device.

11. The visual search system of claim 10 wherein the local image capture device comprises a smartphone including a camera configured to generate the captured digital images.

12. The visual search system of claim 10 wherein the local image capture device comprises at least one camera positioned on a vehicle, each camera configured to generate corresponding captured digital images.

13. The visual search system of claim 10 wherein the remote server system performs feature matching and geometric verification as part of the further searching of the reference image database using the compressed feature descriptors to identify an image in the reference image database.

\* \* \* \* \*